United States Patent [19]
Sansone et al.

[11] Patent Number: 5,599,639
[45] Date of Patent: Feb. 4, 1997

[54] ACID-MODIFIED POLYBENZIMIDAZOLE FUEL CELL ELEMENTS

[75] Inventors: Michael J. Sansone, Berkeley Heights; Frank J. Onorato, Phillipsburg, both of N.J.; Naoya Ogata, Tokyo, Japan

[73] Assignee: Hoechst Celanese Corporation, Somerville, N.J.

[21] Appl. No.: 549,337

[22] Filed: Oct. 27, 1995

Related U.S. Application Data

[63] Continuation-in-part of Ser. No. 521,913, Aug. 31, 1995, abandoned.

[51] Int. Cl.$^6$ ................................................. H01M 8/10
[52] U.S. Cl. ................................................. 429/33; 204/296
[58] Field of Search ............................. 429/33; 252/62.2; 204/296; H01M 8/10

[56] References Cited

U.S. PATENT DOCUMENTS

| | | | |
|---|---|---|---|
| 3,528,858 | 9/1970 | Hodgdon et al. | 429/33 |
| 4,797,185 | 1/1989 | Polak et al. | 429/33 X |
| 4,814,399 | 3/1989 | Sansone et al. | 525/435 |
| 5,403,675 | 4/1995 | Ogata et al. | 429/33 |

FOREIGN PATENT DOCUMENTS 569062  11/1993  European Pat. Off. ......... H01M 8/10

*Primary Examiner*—Stephen Kalafut
*Attorney, Agent, or Firm*—Michael W. Ferrell

[57] ABSTRACT

An electrolytic membrane for use in fuel cell includes a fluid-imbibed acidified polybenzimidazole resin. The resin is alkyl or aryl sulfonated or alkyl or aryl phosphonated, preferably with a degree of substitution of from 15 to about 60 per cent.

17 Claims, 1 Drawing Sheet

FIG. 1A

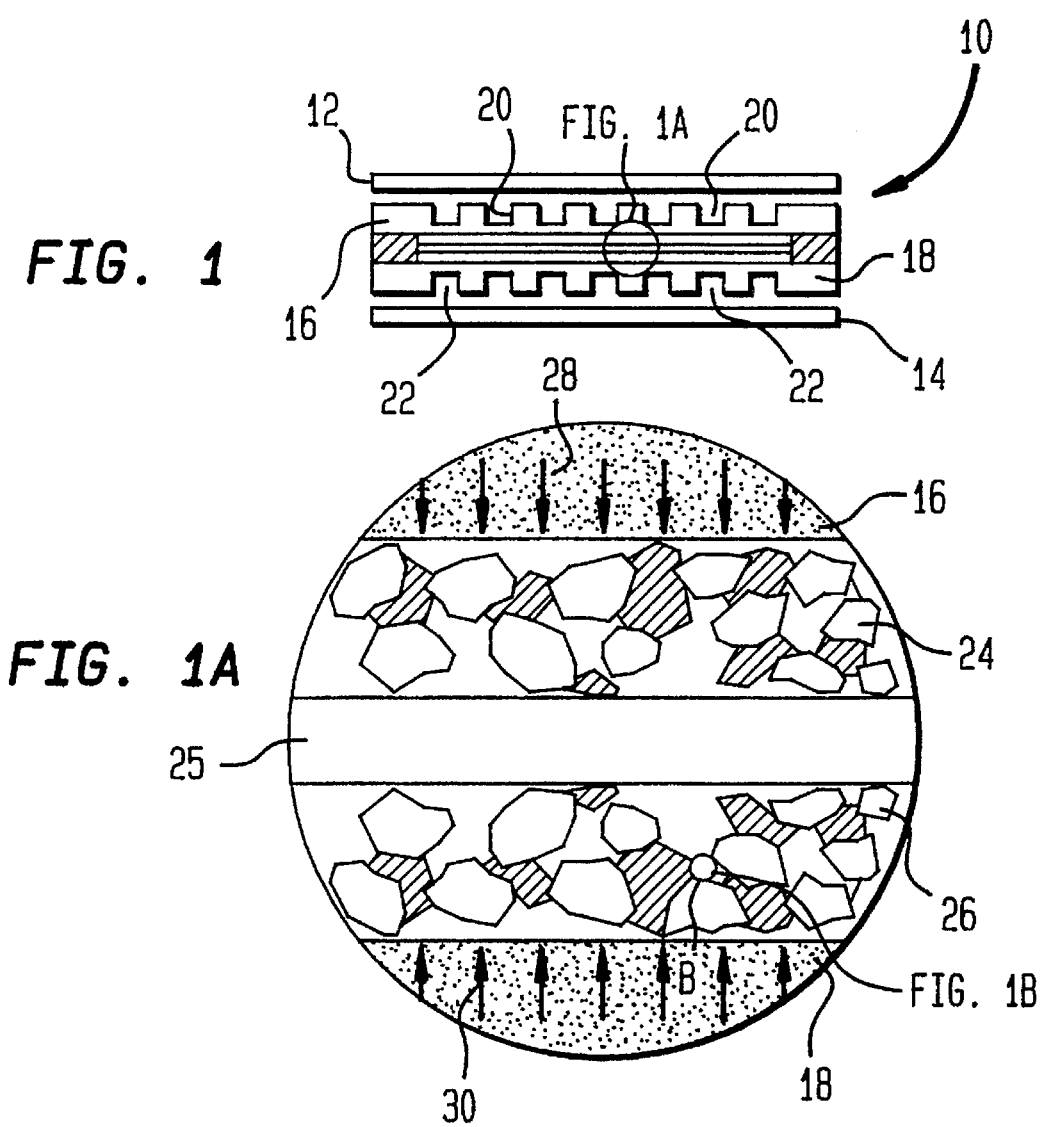
FIG. 1
FIG. 1A
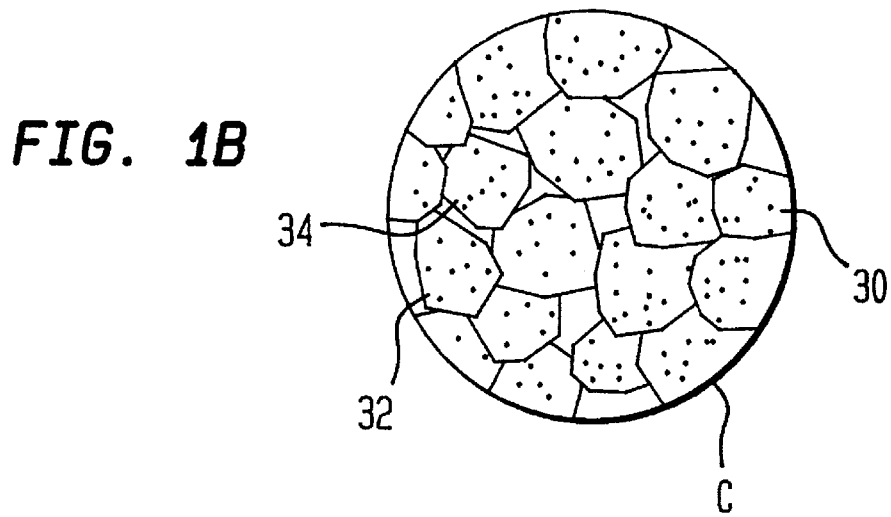
FIG. 1B

ACID-MODIFIED POLYBENZIMIDAZOLE FUEL CELL ELEMENTS

CROSS REFERENCE TO RELATED APPLICATION

This application is a continuation in part of Attorney Docket No. 1520 filed Aug. 31, 1995, entitled "Acid-Modified Polybenzimidazole", bearing U.S. Ser. No. 08/521,913, now abandoned.

TECHNICAL FIELD

The present invention relates to acid-modified polybenzimidazole fuel cell elements and in specific embodiments to alkyl or aryl sulfonated or alkyl or aryl phosphonated polybenzimidazole fuel cell elements.

BACKGROUND

Fuel cells can be configured in numerous ways with a variety of electrolytes, fuels and operating temperatures. For example, fuels such as hydrogen or methanol can be provided directly to the fuel cell electrode or fuels such as methane or methanol can be converted to a hydrogen rich gas mixture external to the cell itself and subsequently provided to the fuel cell. Air is the source of oxygen in most fuel cells, although in some applications the oxygen is obtained by hydrogen peroxide decomposition or from a cryogenic storage system.

Simple fuel cells have the anode reaction:

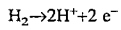

$$H_2 \rightarrow 2H^+ + 2\,e^-$$

and as a cathode reaction:

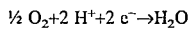

$$\tfrac{1}{2} O_2 + 2\,H^+ + 2\,e^- \rightarrow H_2O$$

Although there are theoretically a limitless number of combinations of electrolyte, fuel, oxidant, temperatures and so on, practical systems include aqueous acid electrolyte systems using hydrogen as a fuel and air as the oxygen source; phosphoric acid electrolyte systems using indirect methanol or hydrocarbons as the fuel and pure oxygen as the oxidant; and solid polymer electrolyte systems using hydrogen or hydrazine as the fuel source and pure oxygen as the oxidant. Solid polymer electrolyte fuel cells sometimes include a sulfonated polyfluoroolefin (Nafion™, manufactured by DuPont) membrane.

The performance, high cost and processability of suitable polymeric electrolyte materials are all important considerations in fuel cell construction. While sulfonated polybenzimidazole polymers are known, see for example U.S. Pat. No. 4,814,399 and it is further known in the art to imbibe polybenzimidazole membranes with a strong acid to make a proton conducting media, performance in terms of conductivity, processability, costs, stability under operating conditions and so on remain significant issues with respect to polymeric media for fuel cells.

SUMMARY OF THE INVENTION

There is provided in accordance with the present invention an electrolytic membrane for use in a fuel cell including a polybenzimidazole resin which has been alkyl or aryl substituted with a phosphonate or sulfonate functionality, formed into a membrane, and imbibed with a fluid. The fluid is either water or an acid medium such as phosphoric acid, phosphorous acid, sulfuric acid, methanesulfonic acid, trifluoromethanesulfonic acid, and the like, that is, a suitable proton acid as well as mixtures of said acid medium and water.

In preferred uses, the inventive membranes communicate via the fluid medium with cathode and anode material affixed or adjacent to opposing surfaces of the membrane.

BRIEF DESCRIPTION OF THE DRAWING

The invention is described below in connection with the drawings wherein:

FIG. 1 is a view in elevation of a single cell of a fuel cell stack;

FIG. 1A is a detail of FIG. 1; and

FIG. 1B is a detail of FIG. 1A where indicated on FIG. 1A.

DETAILED DESCRIPTION

The present invention is described in detail below with reference to various examples and embodiments which are provided for purposes of illustration only. Modifications of the subject matter specifically exemplified will be readily apparent to those of skill in the art, for example, with respect to the specific polybenzimidazole or sulfoalkylation or phosphonation technique.

For example, any suitable polybenzimidazole, typically with a molecular weight between 1000 and 100,000 may be employed. These polymers may be prepared from an aromatic diacid and an aromatic tetramine. Such polymers include: poly-2,2'-(m-phenylene)-5,5'-bibenzimidazole; poly-2,2'-(pyridylene-3",5")-bibenzimidazole; poly-2,2'-(furylene-2", 5")-5,5'-bibenzimidazole; poly-2,2'-(naphthalene-1",6")-5,5'-bibenzimidazole; poly-2,2'-(biphenylene-4",4")-5,5'-bibenzimidazole; poly-2,2'-amylene)-5,5'-bibenzimidazole; poly-2,2'-octamethylene-5,5'-bibenzimidazole; poly-2,6'-(m-phenylene)diimidazobenzene; poly-2'2'-(m-phenylene)5,5'-di(benzimidazole)ether; poly-2'2'-(m-phenylene)5,5'-di(benzimidazole)sulfide; poly-2'2'-(m-phenylene)5,5'-di(benzimidazole)sulfone; poly-2'2'-(m-phenylene)5,5'-di(benzimidazole)methane; poly-2'2"-(m-phenylene)-5,5"-di(benzimidazole)-propane-2,2; and poly-2,2'(m-phenylene)-5',5"-di(benzimidazole)-ethylene-1,2.

The most preferred polybenzimidazole is poly 2,2'-(m-phenylene)-5,5'-bibenzimidazole as characterized by the recurring monomeric unit:

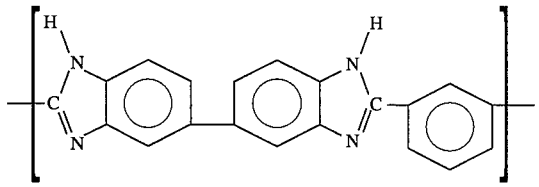

Polybenzimidazoles can also be prepared by autocondensation of at least one aromatic compound having a pair of amine substituents in an ortho position relative to each other and carboxylate ester group positioned upon an aromatic nucleus. Examples of such compounds are esters of diaminocarboxylic acids which include 2,4-diaminonaphthalene acid; 5,6-diaminonaphthalene-1-carboxylic acid; 5,6-diamino-naphthalene-2-carboxylic acid; 6,7-diaminonaphthalene-1-carboxylic acid; 6,7-diaminonaphthalene-2-carboxyl acid; and the like. A preferred compound is 4-phenoxycarbonyl-3',4'-diaminodophenyl ether:

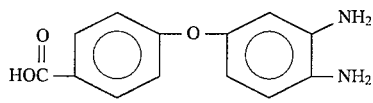

The polymer obtained with 4-phenoxycarbonyl-3',4'-diaminodophenyl ether is poly-5-(4-phenyleneoxy)benzimidazole.

The solvents utilized to form polybenzimidazole polymer solution useful in connection with the present invention include those solvents which are commonly recognized as being capable of dissolving typical unsubstituted polybenzimidazole polymers. For instance, the solvents may be selected from those commonly utilized in the formation of polybenzimidazole dry spinning solutions including N,N-dimethylacetamide, N,N-dimethylformamide, dimethylsulfoxide, and N-methyl-2-pyrrolidone. The particularly preferred solvents are N,N-dimethylacetamide and N-methyl-2-pyrrolidone. Additional representative solvents include formic acid, acetic acid, and sulfuric acid.

The polymer solution may be prepared, for example, by dissolving sufficient polybenzimidazole in the solvent to yield a final solution containing from about 1 to about 30 percent by weight of the polymer based on the total weight of the solution. When the solution contains concentrations of polybenzimidazole less than about 5 percent, the substitutions obtained are less than optimum. When concentrations of polybenzimidazole approach about 30 percent, the polybenzimidazole solution must typically be heated to complete the reaction. Therefore, it is preferred that the concentration of polybenzimidazole in solution ranges from about 5 to about 20 percent by weight, based on the total weight of the solution. The quantity of polybenzimidazole dissolved in the solvent should be such that the resulting solution has a viscosity of about 50 to 4,000 poises at 30° C., and preferably from about 400 to about 600 poises.

One suitable means for dissolving the polymer in the solvent is by mixing the materials at a temperature above the normal boiling point of the solvent, for example, about 25° C. to 120° C. above such boiling point, and at a pressure of 2 to 15 atmospheres for a period of 1 to 5 hours under constant stirring. The resulting solution is preferably filtered to remove any undissolved polymer. A minor amount of lithium chloride (from about 0.5 to about 5 percent by weight based on the total weight of the solution) optionally may be provided to prevent the polybenzimidazole polymer from phasing out of the solution upon standing for extended periods of time.

Acid Modification

Polybenzimidazole polymer in solution is reacted with a suitone to produce an alkyl sulfonated polybenzimidazole derivative as is shown in U.S. Pat. No. 4,814,399. This process is referred to as sulfoalkylation or alkylsulfonation. Sultones are cyclic esters of sulfonic acid, analogous to carboxylic acid lactones. Beta, gamma, delta and eta sultones have been synthesized. As a relatively easily prepared reactive compound for introducing a sulfonate group onto other compounds, sultones have been useful in the synthesis of many products, for example, detergents, for the preparation of dyestuff intermediates, as surface active agents in textiles, and as insect repellents. Because of the high reactivity of sultones, a variety of compounds have been sulfoaklylated with sultones including inorganic salts, ammonia, amines, amides, phosphines, phosphoric acid esters, carboxylic acid salts, alcoholates, mercaptides and phenolates. For a general review of suitone chemistry, see Ahmed Mustafa, *Chemical Review*, pp. 195–223, (1954), which is incorporated herein by reference. The reaction of sultones with polybenzimidazoles may be enhanced with the addition of an alkali metal hydride if so desired.

Following is a typical example of forming a alkylsulfonated polybenzimidazole resin through reaction of polymer with a suitone, as is shown in U.S. Pat. No. 4,814,399.

EXAMPLE 1

To a round bottom reaction flask was added 9.62 grams of poly 2,2'-(m-phenylene)-5,5'-bibenzimidazole (0.77 i.v.) dissolved in 86.48 grams of N-methyl-2-pyrrolidone. Following the addition of 0.6 grams of lithium hydride, the solution was heated to 70° C. and maintained at that temperature for 12 hours. After all the bubbling had ceased, 7.62 grams of 3-hydroxy-1-propane sulfonic acid suitone mixed with 4.5 grams of N-methyl-2-pyrrolidone were added dropwise by an addition funnel to the reaction vessel. The contents were heated to 70° C. and maintained at that temperature for 12 hours. under constant stirring. A 5.0 gm sample was withdrawn from the reaction vessel and precipitated by the addition of 20.0 gms of acetone. Using nuclear magnetic resonance spectroscopy, the precipitate was analyzed and it showed a 72 percent substitution on the available polybenzimidazole imidazole sites of the sulfopropyl substituent. Other sulfoakyl substituted polybenzimidazoles are prepared following the same general procedure with other sultones.

If an arylsulfonated polymer is desired, the procedure is as follows:

EXAMPLE 2

To a round bottom reaction flask are added 15.7 grams of poly-2,2'(m-phenylene)-5,5'-bibenzimidazole dissolved in 141.3 grams hydride in the amount of 0.8 grams is also added. The solution is heated to 70° C. and maintained at that temperature for twelve hours. After all the bubbling has ceased, 19.8 grams of 4-chloro-3-nitro benzenesulfonic acid sodium salt mixed with 10 grams of N-methyl-2-pyrrolidone is added and the temperature raised to 80° C. and held there for 12 hours with constant stirring. A 5 gram sample is withdrawn from the mixture, cooled to room temperature, precipitated in acetone, and analyzed by NMR spectroscopy. Fifty two percent of the available imidazole sites on the polybenzimidazole polymer is found to be substituted with the nitrobenzenesulfonate group.

Phosphonation

Alkyl or aryl phosphonated polybenzimidazoles may be prepared in a variety of ways, specifically as follows:

EXAMPLE 3

Ten grams of poly[2,2'-(m-phenylene)-5,5'-bibenzimidazole] and 0.5 gram LiCl dissolved in 90 grams of DMAC are added to a round-bottom flask. Lithium hydride, 0.52 g, is added to the flask and the solution heated to 70° C. and maintained at that temperature for twelve hours. Eight grams of 2-chloroethylphosphonic acid-triethylamine salt is added and the temperature raised to 85 C. for five hours. Then the solution is cooled to room temperature and poured into methanol to precipitate the modified polymer.

The polymer is then washed with dilute HCl to remove triethylamine and convert the phosphonic groups to acid form. The expected degree of phosphonation of available imidazole sites is about 60%, which can be measured by standard elemental analysis methods

EXAMPLE 4

Ten grams of poly[2,2'-(m-phenylene)-5,5'-bibenzimidazole] and 0.5 gram LiCl dissolved in 90 grams of DMAC are added to a round-bottom flask. Lithium hydride, 0.52 g, is added to the flask and the solution heated to 70° C. and maintained at that temperature for eight hours. Twelve grams of diethyl-2-bromoethyl phosphonate are added to the flask and the temperature is raised to 80 C. for twelve hours. The degree of phosphonate ester substitution is expected to be 55–60%; it may be measured by NMR spectroscopy.

To the solution is added eight grams of benzyltrimethylammonium hydroxide and the temperature raised to 85 C. for four hours to convert the ester to an acid salt. The solution is then cooled to room temperature and poured in methanol to precipitate the polymer. The polymer is treated with 0.1% HCl to convert the salt groups to acid form.

EXAMPLE 5

Ten grams of poly[2,2'-(m-phenylene)-5,5'-bibenzimidazole] and 0.5 gram LiCl dissolved in 90 grams of DMAC are added to a round-bottom flask. Lithium hydride, 0.52 g, is added to the flask and the solution heated to 70 C. and maintained at that temperature for twelve hours. Thirteen grams of diethyl (bromodifluoromethyl) phosphonate are added to the flask and the temperature is raised to 80 C. for twelve hours. The solution is then cooled to room temperature and poured in methanol to precipitate the polymer. The degree of phosphonate ester substitution is expected to be 60–65%; it may be measured by NMR spectroscopy.

EXAMPLE 6

Ten grams of poly[2,2'-(m-phenylene)-5,5'-bibenzimidazole] and 0.5 gram LiCl dissolved in 90 grams of DMAC are added to a round-bottom flask. Lithium hydride, 0.52 g, is added to the flask and the solution heated to 70 C. and maintained at that temperature for twelve hours. Thirteen grams of diethyl (bromodifluoromethyl) phosphonate are added to the flask and the temperature is raised to 80 C. for twelve hours. To the solution is added seven grams of lithium iodide and the temperature raised to 100 C. for six hours to convert the ester to a lithium salt. The polymer is treated with dilute HCl to convert the salt groups to acid form. The solution is then cooled to room temperature and poured in methanol to precipitate the polymer. The degree of phosphonation is expected to be 60–65%; it may be measured by NMR spectroscopy.

Generally the polybenzimidazole backbone has acidic groups covalently bonded to the imidazole nitrogen atoms thereof, the acidic groups selected from the group consisting of —$R^1PO_3R^2R^3$, —$R^1CO_2R^2$, and —$R^1SO_3R^2$, wherein $R^1$ is an alkyl, aryl or arenyl group having 1–10 carbon atoms, and $R^2$ and $R^3$ are each independently a hydrogen or a cation or an alkyl, aryl or arenyl group having 1–10 carbon atoms.

Membrane Formation

The polymers described hereinabove are formed into conductive membranes as described below:

EXAMPLE 7

A 15 weight % solution of high IV (1.03) propylsulfonated PBI (poly 2,2'm-phenylene 5,5' bibenzimidazole, prepared in accordance with Example 1, ) and dimethyl acetamide (DMAC) was prepared by mixing 170 grams of DMAC with 30 grams of sulfonated PBI in a stainless steel vessel. The solution was then tumbled for eight hours at 265° C. The solution was then cooled to room temperature and filtered through a Dynalloy X7 stainless steel filter element (25 µm). Polymer membranes were prepared by casting the solution onto a glass plate with a 12 mil (30.5× $10^{-5}$ m) knife gap. The plate was then transferred to a coagulation bath for four minutes. The coagulation solution consisted of 100 weight percent acetone. The resulting membrane was then transferred to a water bath for 4 minutes to remove any residual solvent. The membrane was then placed in a vacuum oven (18 inches Hg) with a nitrogen purge at 150° C. for 24 hours to dry.

EXAMPLE 8

A 15 weight % solution of high IV (1.03) butylsulfonated PBI (poly 2,2' m-phenylene 5,5' bibenzimidazole, prepared in accordance with Example 1, ) and dimethyl acetamide (DMAC) is prepared by mixing 170 grams of DMAC with 30 grams of sulfonated PBI in a stainless steel vessel. The solution is then tumbled for eight hours at 265° C. The solution is then cooled to room temperature and filtered through a Dynalloy X7 stainless steel filter element (25 µm). Polymer membranes are prepared by casting the solution onto a glass plate with a 12 mil (30.5×$10^{-5}$ m) knife gap. The plate is then transferred to a coagulation bath for four minutes. The coagulation solution consists of 100 weight percent acetone. The resulting membrane is then transferred to a water bath for 4 minutes to remove any residual solvent. The membrane is then placed in a vacuum oven (18 inches Hg) with a nitrogen purge at 150° C. for 24 hours to dry.

EXAMPLE 9

A 10 weight % solution of high IV (1.03) propylsulfonated PBI (poly 2,2' m-phenylene 5,5' bibenzimidazole, prepared in accordance with Example 1, ) and dimethyl acetamide (DMAC) is prepared by mixing 170 grams of DMAC with 30 grams of sulfonated PBI in a stainless steel vessel. The solution is then tumbled for eight hours at 265° C. The solution is then cooled to room temperature and filtered through a Dynalloy X7 stainless steel filter element (25 µm). Polymer membranes are prepared by casting the solution onto a glass plate with a 12 mil (30.5×$10^{-5}$ m) knife gap. The plate is then transferred to a coagulation bath for four minutes. The coagulation solution consists of 50 weight percent acetone and 50 weight percent water. The resulting membrane is then transferred to a water bath for 4 minutes to remove any residual solvent. The membrane is then placed in a vacuum oven (18 inches Hg) with a nitrogen purge at 150° C. for 24 hours to dry.

EXAMPLE 10

A 15 weight % solution of high IV (1.03) propylsulfonated PBI (poly 2,2' m-phenylene 5,5' bibenzimidazole, prepared in accordance with Example 1, ) and dimethyl acetamide (DMAC)is prepared by mixing 170 grams of DMAC with 30 grams of sulfonated PBI in a stainless steel vessel. The solution is then tumbled for eight hours at 265° C. The solution is then cooled to room temperature and filtered through a Dynalloy X7 stainless steel filter element (25 µm). Polymer membranes are prepared by casting the solution onto a glass-plate with a 12 mil (30.5×$10^{-5}$ m) knife gap. The plate is then transferred to a coagulation bath for four minutes. The solution consists of 70 weight percent acetone and 30% water. The resulting porous membrane is then transferred to a water bath for 4 minutes to remove any residual DMAC. The washed membrane is then transferred to a 25 weight percent phosphoric acid water solution for 4 minutes to imbibe the membrane with acid. The acid laden membrane is then air dried for 30 minutes and place in a vacuum oven (18 inches Hg) with a nitrogen purge at 150° C. for 24 hours to collapse the porous structure and entrap the imbibed acid.

EXAMPLES 11–13

Films produced in accordance with example 7 and imbibed with water by exposure to humidified air or soaking if so needed were mounted in a conductivity cell and the proton conductivity was measured as a function of the fraction of substitution under similar conditions. A film with a substitution of 29.4% had a conductivity of 0.002 siemens/cm at 80° C. A film with a substitution of 36.6% had a conductivity of 0.005 siemens/cm at 80° C. A film with a substitution of 55.4% had a conductivity of 0.01 siemens/cm at 80° C.

Proton conductivity is preferably measured by using a four probe method. Two electrodes attached longitudinally to the membrane/film are used to inject a known current at a specified frequency into the membrane. Two additional probes located approximately 1 cm from each film end and separated by one cm are used to measure the voltage drop. The films are approximately 4 mils thick and 0.5 mm in width. Conductivity is calculated knowing the film dimensions, the applied current, and the measured voltage drop. The measurements are made in a cell that allows for control of the environmental temperature, pressure and composition.

Fuel Cell Construction

FIG. 1 shows diagrammatically a basic single cell structure 10 that is the elemental unit of a fuel cell stack. There is provided generally a pair of separator plates 12, 14 as well as adjacent thereto a pair of substrate elements 16, 18. The substrate elements define, together with the separator plates, a plurality of passages indicated at 20,22 for fuel gas, such as hydrogen, and oxidant gas such as air. In this diagram, passages 20 are to receive hydrogen and passages 22 are to receive air. Substrates 16, 18 are readily permeable to these gasses which permeate to the anode and cathode layers as noted below.

For purposes of illustration, the area indicated is magnified to show an anode catalyst layer 24 as well as a cathode layer 26 as shown on FIG. 1A. Hydrogen permeates through substrate 16 in the direction shown by arrows 28, and air permeates through substrate 18 in the general direction indicated by arrows 30. Adjacent upper substrate 16 is the anode catalyst layer 24, while cathode layer 24 is adjacent lower substrate 18. In between the electrode layers 24, 26 is an electrolytic membrane 25, which may be formed in accordance with examples 7 through 10, or of course utilizing the other polymers described above. Prior to, or after being mounted within cell 10, membranes 25 are suitably imbibed with water or phosphoric acid as further noted below.

The cathode and anode electrode layers consist of a porous catalyst layer which is illustrated in C as shown on FIG. 1B, which is a magnification at B of the cathode layer. Very generally, the electrodes consist of a plurality of catalyst particles 30, formed of a porous particulate substrate 32 acting as a support for fine particles of a novel metal 34. Novel metal 34 is typically platinum, however composite catalysts are sometimes used such as platinum with chromium, titanium, tungston or the like. Catalyst layers 26, 24 are formed by joining together the carbon particles 30 with a fluorinated resin such as PTFE; typically on a carbon-paper substrate (not shown).

The carbon paper serves as a structural support for the electrocatalyst layer, as well as the current collector. Typical carbon paper has an initial porosity of about 90%, which is reduced to about 60% by impregnation with 40 wt % PTFE. This moisture-proof carbon paper contains macropores of 3 to 50 µm diameter and micropores with a median pore diameter of about 3.4 nm for gas permeability.

Heat-treated carbon blacks useful as the particulate support for the metal catalyst demonstrate high corrosion resistance. For example, the corrosion rate of acetylene black heat-treated at 2,700° C. is a tenth that of untreated acrtylene black. Fully graphited carbons also show high corrosion resistance. These carbon materials are heat treated at 1,400° to 3,000° C. However, heat-treatment at above 2,500° C. or prolonged treatment causes a lowering of the mechanical strength of the carbon. Generally, in order to improve cell performance, operation at high temperature and high pressure is desirable. Thus, carbides of titanium or tantalum are being investigated as materials stable under such conditions. The problems with these materials are low porosity and high cost.

The thickness of the electrode layers is about 0.4 mm and the specific surface area of the carbon material is about 100 $m^2/g$. The amount of catalyst metal is generally about 0.25 to 0.75 $mg/cm^2$ for anodes and 0.5 to 0.75 $mg/cm^2$ for cathodes.

A carbon paper supported electrode layer need only be mechanically sandwiched with the other layers. It is possible to directly adhere catalyst particles to the membranes of the present invention by kiss coating or hot pressing.

The membranes 25 of the present invention are suitably imbibed with a fluid so that the electrodes are in conductive communication with each other, that is, so that protons may be conducted from the anode to the cathode. The fluid may be either phosphoric acid or other acid or water and perhaps mixtures thereof. The important feature of the fluid is that it be capable of proton transfer. Generally speaking, protic acids meet this criteria. For acidloaded membranes, a loading of 3–5 molecules of acid per repeat unit are preferred, and such loading is preferably carried out prior to incorporation into the fuel cell structure as noted in connection with respect to water loaded membranes, the water content will vary with the degree of substitution. Generally, enough water is present so that the conductivity is at least about $10^{-4}$ Siemens per centimeter. Typically, the fluid-imbibed membranes of the present invention exhibit a conductivity of from about $10^{-4}$ to about $10^{-2}$ Siemens per centimeter. In operation, the membranes conduct protons from the anode to the cathode and act as the electrolyte.

The degree of covalently bonded alkyl or aryl acid substitution may vary, however, it is typical to provide from about 5 to about 85% substitution. One hundred per cent substitution is 2 substitutions per repeat unit, that is, one alkyl or aryl acid substitution on each imidazole nitrogen. More typically, the resins utilized in accordance with the present invention are from.,10–75% substituted, with about 15–60% or 15–40% substituted being preferred.

We claim:

1. An electrolytic membrane for use in a fuel cell comprising an acidified polybenzimidazole resin membranous structure imbibed with phosphoric acid wherein said polybenzimidazole resin is covalently functionalized at its imidazole nitrogens with an alkyl or aryl acid moiety selected from the group consisting of organo sulfonate and organo phosphorylate substitutions and mixtures thereof.

2. The membrane according to claim 1, wherein said acid is present in an amount of from about 3 to about 5 molecules of acid per repeat unit of said polybenzimidazole resin.

3. The membrane according to claim 1, wherein the conductivity of said membrane is from about $10^{-4}$ to about $10^{-2}$ Siemens per centimeter.

4. The membrane according to claim 1, wherein said polybenzimidazole resin is poly 2,2'-(m-phenylene)-5,5'-bibenzimidazole.

5. The membrane according to claim 1, wherein said polybenzimidazole membrane is alkyl or aryl sulfonated.

6. The membrane according to claim 1, wherein the degree of alkyl or aryl acid substitution on said polybenzimidazole resin is from about 5 to about 85 per cent of the available imidazole nitrogens.

7. The membrane according to claim 6, wherein the degree of alkyl or aryl acid substitution is from about 10 to about 75% of the available imidazole nitrogens.

8. The membrane according to claim 1, wherein the degree of aklyl or aryl acid substitution on said polybenzimidazole resin is from about 15 to about 40%.

9. A fuel cell element comprising an anode, a cathode and an electrolyte membrane therebetween, said membrane comprising an acidified polybenzimidazole resin membranous structure imbibed with a fluid selected from the group consisting of water, acid media and mixtures of acids and water wherein said polybenzimidazole resin is covalently functionalized on at least a portion of its imidazole nitrogens with an alkyl or aryl acidic moiety, and wherein said acidic moiety is a phosphorylate and wherein further said membrane is operative to conduct protons between said anode and said cathode.

10. The fuel cell element according to claim 9, wherein said fuel cell element includes a platinum metal catalyst on at least one of said electrodes.

11. The fuel cell element according to claim 10, wherein said platinum metal catalyst is supported on a porous carbon substrate.

12. The fuel element according to claim 11, wherein said platinum metal is catalyst present on said anode at a concentration of at least about 0.25 mg/cm$^2$.

13. The fuel cell element according to claim 11, wherein said platinum metal catalyst is present on said cathode at a concentration of at least 0.5 mg/cm$^2$.

14. The fuel cell element according to claim 9, wherein said fluid is phosphoric acid.

15. The fuel cell element according to claim 9, wherein said fluid is water.

16. The fuel cell element according to claim 15, wherein said acidic moiety is a sulfonate.

17. The fuel cell element according to claim 9, wherein said membrane exhibits a conductivity of from about $10^{-4}$ to about $10^{-2}$ Siemens per centimeter.

* * * * *